United States Patent Office 3,408,757
Patented Nov. 5, 1968

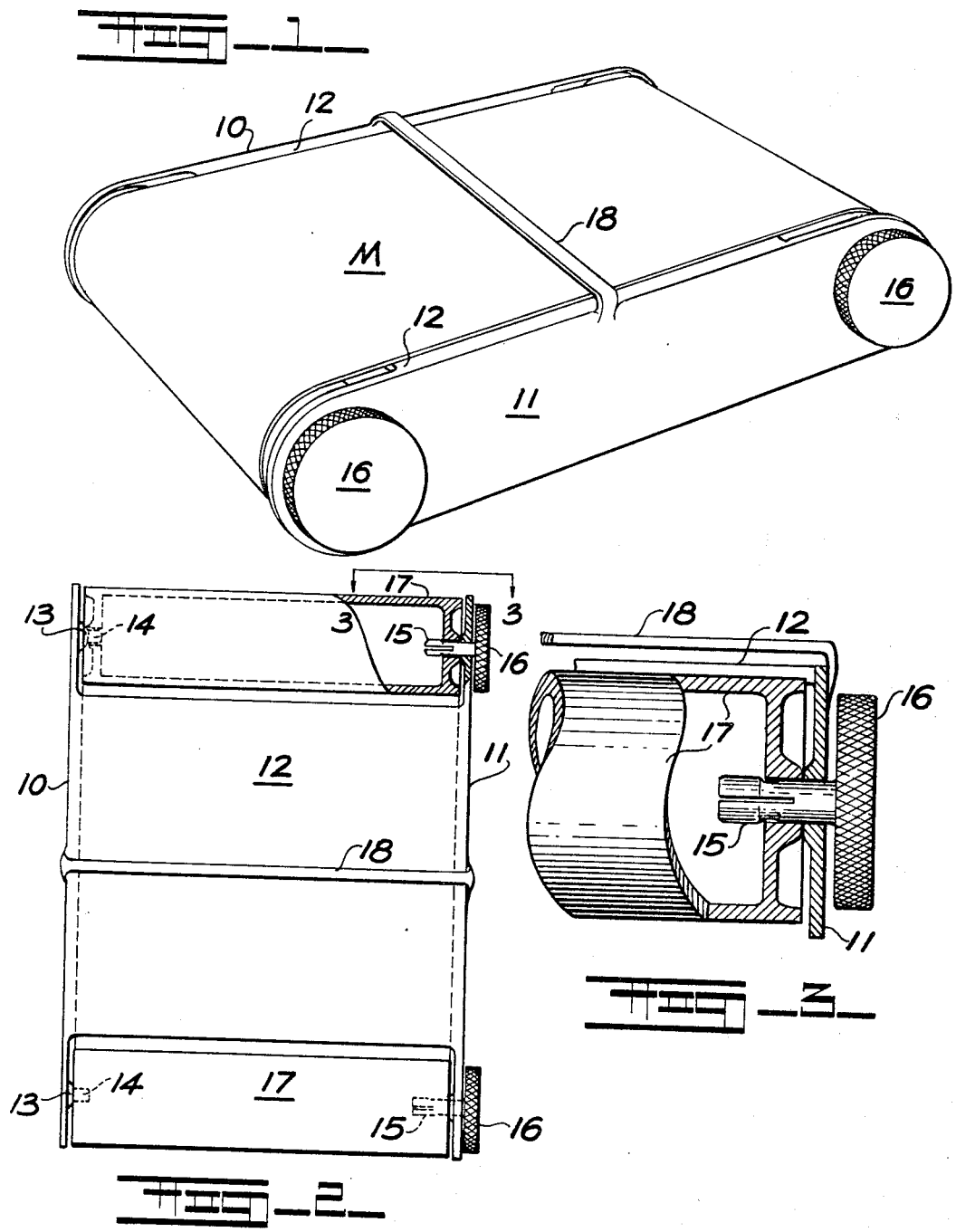

3,408,757
MAP ROLL AND DISPLAY DEVICE
Dale A. McQuistion, 433 Fairfield Ave.,
Columbiana, Ohio 44408
Filed Aug. 25, 1966, Ser. No. 575,105
3 Claims. (Cl. 40—86)

ABSTRACT OF THE DISCLOSURE

A display device for strip maps having a flat top portion with down turned sides and spaced outwardly extending portions on the ends of said sides for receiving rollers on which said strip map is carried, and a transversely positioned raised indicator above said top portion.

---

This invention relates to a device for displaying a map and more particularly a map formed in an elongated strip capable of being rolled up on a suitable roller.

The principal object of the invention is the provision of a display device for strip maps which incorporates a housing for holding the rolled strip maps and means for displaying a substantial portion thereof on a horizontal plane.

A further object of the invention is the provision of a display device for strip maps which includes a novel indicator or finder portion positioned transversely of the map and beneath which the strip may be moved.

A still further object of the invention is the provision of a display device for strip maps which may be economically formed of various materials, including plastic, easily assembled and in which the rollers holding the rolled strip map may be readily positioned and operated.

A still further object of the invention is the provision of a display device for strip maps which is compaced, light in weight and may be easily carried in a glove compartment of an automobile if desired.

The display device for strip maps disclosed herein comprises an improvement in the art and particularly with respect to the feature of the device which permits a relatively large area of the strip map to be displayed at one time while at the same time providing for moving the map from one roll to another so that the entire map may be progressively displayed and examined. In similar devices heretofore known in the art, the display area has been relatively small and the devices have provided no means of readily establishing a reference point relative to the map. The present invention includes a novel indicator or finder arm which is extended across the display area substantially midway thereof, so that as the map is rolled therebeneath, the particular portion of the map in which the user is interested may be kept in proximity to the indicator or finder arm and thus the map may be examined in a very brief period of time and the information desired quickly obtained.

With the foregoing and other objects in view which will appear as the description proceeds, the invention resides in the combination arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the display device for strip maps.

FIGURE 2 is a top plan view of the display device for strip maps with parts broken away and parts in cross section.

FIGURE 3 is an enlarged detailed elevation on line 3—3 of FIGURE 2.

By referring to the drawings and FIGURE 1 in particular it will be seen that the display device for strip maps comprises a pair of spaced parallel vertically standing body members 10 and 11, each of which is rounded at its opposite ends. The spaced parallel vertically standing body members 10 and 11 are connected at their uppermost surfaces with a flat horizontally disposed top portion 12 as best seen in FIGURE 2 of the drawings. The top portion 12 comprises a rectangular area shorter than the side portions 10 and 11 as the same terminates inwardly from the rounded ends thereof as clearly illustrated in FIGURE 1 of the drawings. The inner surface of the side portion 10 is provided with a pair of inwardly extending bosses 13, each of which in turn has a short projecting pin 14. The side portion 11 has a pair of aperture in oppositely disposed relation to the pins 14 and normally receiving and rotatably mounting a pair of stub shafts 15, each of which has a knurled hand wheel 16 on its outer end. The stub shafts 15 are split and tensioned so that they will be self retaining although removable from the ends of a pair of rolls 17 and the construction is best illustrated in FIGURES 2 and 3 of the drawings and FIGURE 3 in particular wherein an enlarged detail of an end portion of one of the rolls 17 is illustrated showing the same in engagement on the split stub shaft 15 and frictionally held thereon, as will be understood by those skilled in the art.

The rolls 17 are thus capable of being moved into position between the side portions 10 and 11 of the display device for strip maps and retained in revolvable relation by the insertion of the split stub shafts 15 and the hand wheels 16 as heretofore described. The side portions 10 and 11 resiliently engage the ends of the rolls 17.

By referring again in FIGURE 1 of the drawings, it will be seen that a strip map M is shown rolled on the rolls 17 and extended across the flat top 12 of the device inwardly of the inner edges of the side portions 10 and 11. It will also be seen that a considerable portion of the strip map is displayed as it is visible over the entire upper surface of the device, including the curved end portions which are, of course, defined by the rollers on which the strip map is positioned. As the knurled hand wheels 16 are revolved, the map will roll from one of the rollers 17 to the other and progressively pass across the top of the device and beneath an indicator or finder arm 18 which extends transversely of the device above the top 12 thereof and is attached to the outer opposite sides of the side portions 10 and 11. The indicator or finder arm 18 provides a ready point of reference with respect to a portion of the strip map being displayed therebeneath and particularly when the strip map is moved therebeneath as by turning one of the hand wheels 16 so as to move the strip map from one roller 17 to the other.

It will thus be seen that a display device for strip maps has been disclosed which is simply formed, capable of easy operation, particularly with respect to positioning strip map rolls therein and that it possesses the unique advantage of display a very large area of strip maps and at the same time provides an indicator or finder arm for locating and maintaining reference to a particular portion of the map.

It will thus be seen that a display device for strip maps has been disclosed which meets the several objects of the invention and having thus described my invention, what I claim is:

1. A display device for strip maps comprising a pair of spaced parallel vertically standing side portions having a flat longitudinally extending top portion interconnecting the same inwardly of the ends thereof, roll receiving configurations on said side portions adjacent the ends thereof extending outwardly from said flat top portion, rolls removably and revolvably positioned between said side portions in said roll receiving configurations, a strip map extending over said flat top portion and curving downwardly over said rollers and between said roll receiving configurations, said strip map being visible between said roll receiving configurations and over the flat top portion, and a fixed transverse indicator member extending between said side portions and spaced above said top portion and providing an area therebeneath through which said strip may move across said top portion.

2. The display device for strip maps set forth in claim 1 and wherein said roll receiving configurations comprise bosses and pivot pins on one of said side portions and apertures and removable rotatable stub shafts on the other of said side portions and wherein said stub shafts are provided with knurled hand wheels on their outermost ends and means on said stub shafts for frictionally engaging said rolls so that said rolls may be rotated by motion applied to said knurled hand wheels.

3. The display device for strip maps set forth in claim 1 and wherein said spaced side portions and interconnecting top portion are formed of resilient material arranged to apply a degree of friction to the ends of said rolls so as to hold the same when they are not deliberately moved.

References Cited
UNITED STATES PATENTS

| | | | |
|---|---|---|---|
| 1,821,844 | 9/1931 | McGrath | 40—86 |
| 2,591,844 | 4/1952 | Macripo | 40—86 |

FOREIGN PATENTS

| | | |
|---|---|---|
| 591,598 | 4/1925 | France. |
| 591,134 | 8/1947 | Great Britain. |

EUGENE R. CAPOZIO, *Primary Examiner.*

W. H. GRIEB, *Assistant Examiner.*